UNITED STATES PATENT OFFICE.

RUDOLPH EDWARD WEISSMÜLLER, OF RUNCORN, ENGLAND, ASSIGNOR TO WILLIAM GOSSAGE & SONS LIMITED, OF WIDNES, ENGLAND.

MANUFACTURE OF SOLUBLE ALKALI SILICATES.

932,204.          Specification of Letters Patent.     Patented Aug. 24, 1909.

No Drawing.     Application filed June 12, 1908.    Serial No. 438,113.   (Specimens.)

*To all whom it may concern:*

Be it known that I, RUDOLPH EDWARD WEISSMÜLLER, a subject of the King of Great Britain, of Heath Road, Runcorn, in the county of Chester, England, chemist, have invented new and useful Improvements in the Manufacture of Soluble Alkali Silicates, of which the following is a specification.

Silicates of soda and potash have hitherto been produced in a solid form by melting the constituents together and allowing them to cool, the product thus obtained requiring considerable pressure for effecting their solution in boiling water. In order to obviate the necessity for the employment of means for applying such considerable pressure at the place of utilization, the said silicates have been dissolved under heat and pressure at the place of manufacture, or at a place provided with a special plant for the purpose, and sold, transported and stored as a solution, such solution requiring to be put up in expensive barrels, or containers, and entailing considerable cost in freight, or carriage, owing to the large amount of water contained in such solutions.

The object of this invention is to provide silicates of soda, and of potash, or mixtures of these, such that while the product is in a dry condition requiring no expensive barrels, or containers, for transport and storage, it is also in such a form, or condition, that it can be dissolved readily in hot, or boiling, water at the place of utilization, thus both lessening the cost of freight, or carriage, as compared with silicates in solution and enabling consumers to obtain solutions without expensive plant for effecting solution.

According to this invention, silicate of soda, or of potash, derived from any source, or produced in any ordinary, or suitable, way, or a mixture of such silicates, while in a molten condition, for instance in the condition in which it is produced by melting the alkaline constituent and silicious material together, is subjected to the action of fluid, or vapor, which is forced under pressure into, through, or in contact with, the said molten silicate, or mixture of silicates, preferably by projecting the said fluid, or vapor, with considerable force against the molten silicate, or mixture of silicates, as it leaves the vessel in which it is produced in a molten condition. The fluid, or vapor, employed may, for example, be steam, or air, or any suitable gas, or gases, or two, or more, of these, and either cold, hot, or superheated.

The invention may be carried out as follows:—The alkaline constituent, or constituents, and the silicious material, such as sand, having been melted together in a suitable furnace, or vessel, to form silicate of soda, or of potash, or a mixture of such silicates, is allowed to run in a falling stream, or streams, from the outlet from the furnace, or vessel, and a jet, or jets, of steam, air, or gas, or two, or more, of these, under pressure is, or are, directed with great force across the path of the stream, or streams, of molten silicate, or mixture of silicates, or otherwise, so that the steam, or other vapor, or air, or gas, or two, or more, of them, comes, or come, into contact with the molten mass and brings, or bring, it into a form, or condition, resembling scales in appearance. In this form, or condition, the silicate, or mixture of silicates, can be put in bags, bales, or boxes, which may be of a cheap character and need not be of the substantial and expensive character necessary for containing silicate in the form of a solution.

The silicate, or mixture of silicates, produced as described, although it is dry, can be readily dissolved, in hot, or boiling, water at the place of utilization without any expensive plant being required for the purpose, and of course the transport of the product in the dry condition is much cheaper than is the transport in the form, or condition, of a solution.

In the following claiming clauses "silicate" means silicate of soda, or silicate of potash, or a mixture of such silicates; "alkali" means soda, or potash, or a mixture of these; "sand" means any suitable silicious material, and "fluid" means steam, air, or gas, or other suitable fluid, or vapor, or two, or more, of them.

Having now particularly described and ascertained the nature of my said invention and in what manner the same is to be performed, I declare that what I claim is:—

1. As a new article of manufacture, a scaly anhydrous alkali silicate readily soluble in water at atmospheric pressure, substantially as described.

2. As a new article of manufacture, a readily soluble, anhydrous alkali silicate in the form of flat scales, substantially as described.

3. As a new article of manufacture, an anhydrous alkali silicate in scaly form and readily soluble in heated water.

4. As a new article of manufacture, an anhydrous alkali silicate readily soluble in water and in the scaly form resulting from the dispersion of a stream of molten silicate by a fluid blast.

In testimony whereof I have signed my name to this specification in the presence of two subscribing witnesses.

RUDOLPH EDWARD WEISSMÜLLER.

Witnesses:
HERBERT WILLIAMS,
WILLIAM EDWIN McMULLEN.